Aug. 22, 1961　　　　G. W. ROME　　　　2,996,927
STARTER FOR LAWN MOWER ENGINES
Filed Nov. 10, 1959　　　　　　　　　　3 Sheets-Sheet 1
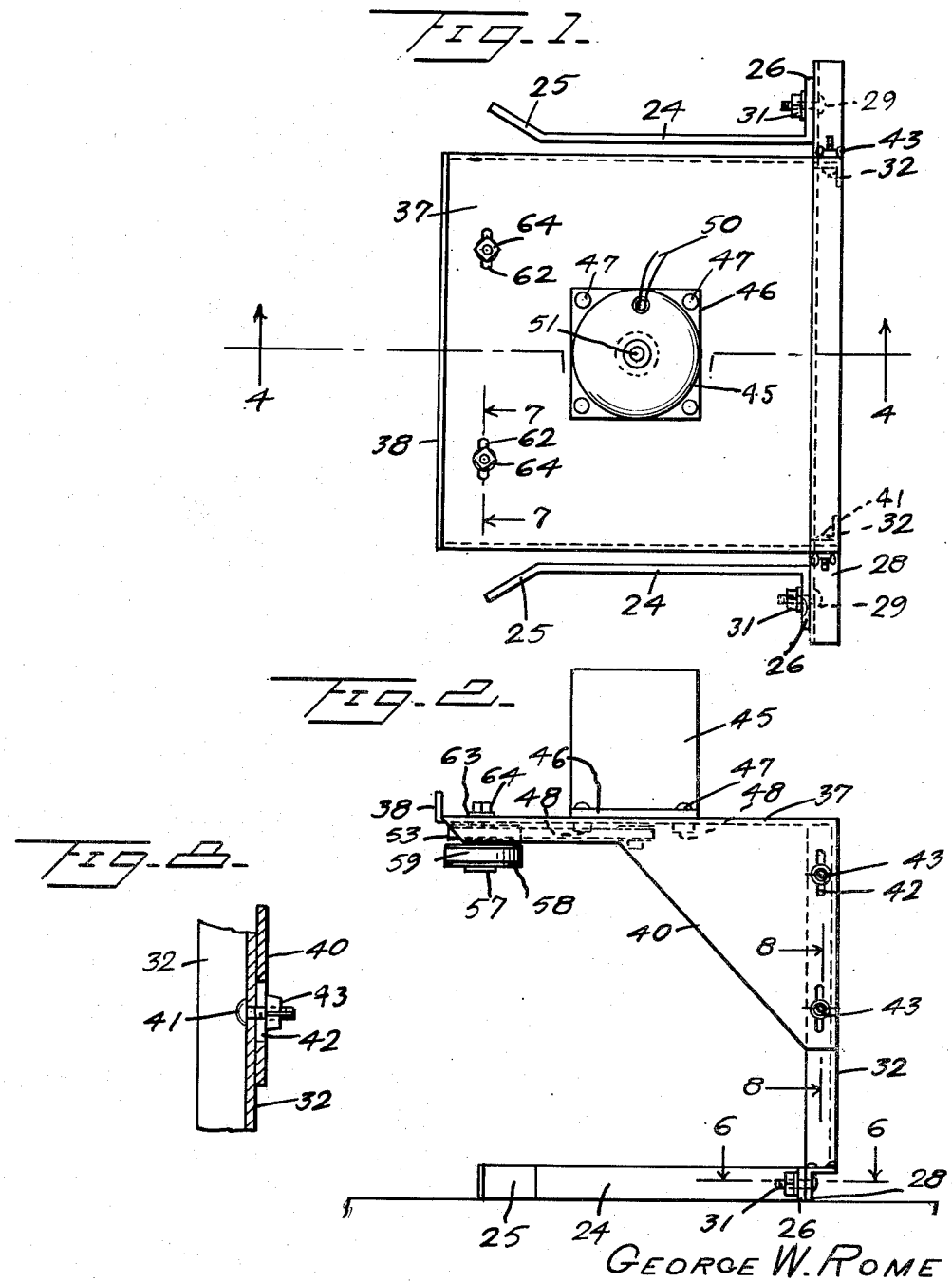

Aug. 22, 1961  G. W. ROME  2,996,927
STARTER FOR LAWN MOWER ENGINES
Filed Nov. 10, 1959  3 Sheets-Sheet 2
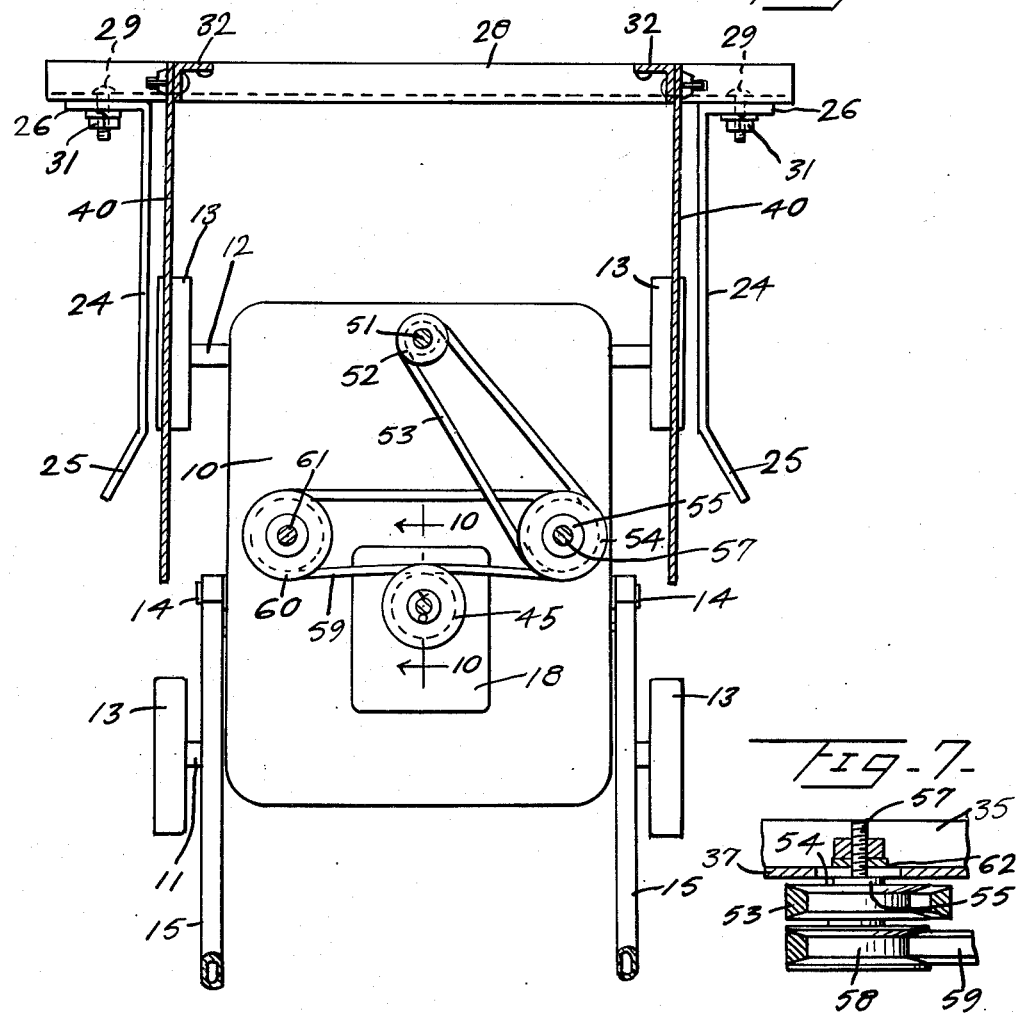
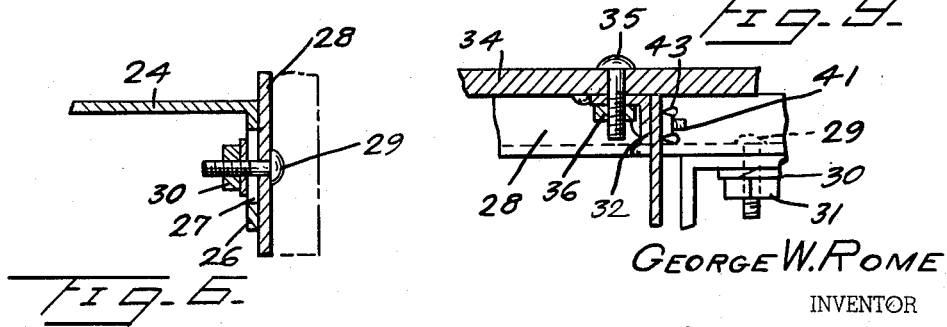
GEORGE W. ROME
INVENTOR
BY *C. A. Knowles.*
ATTORNEYS.

Aug. 22, 1961 G. W. ROME 2,996,927
STARTER FOR LAWN MOWER ENGINES
Filed Nov. 10, 1959 3 Sheets-Sheet 3
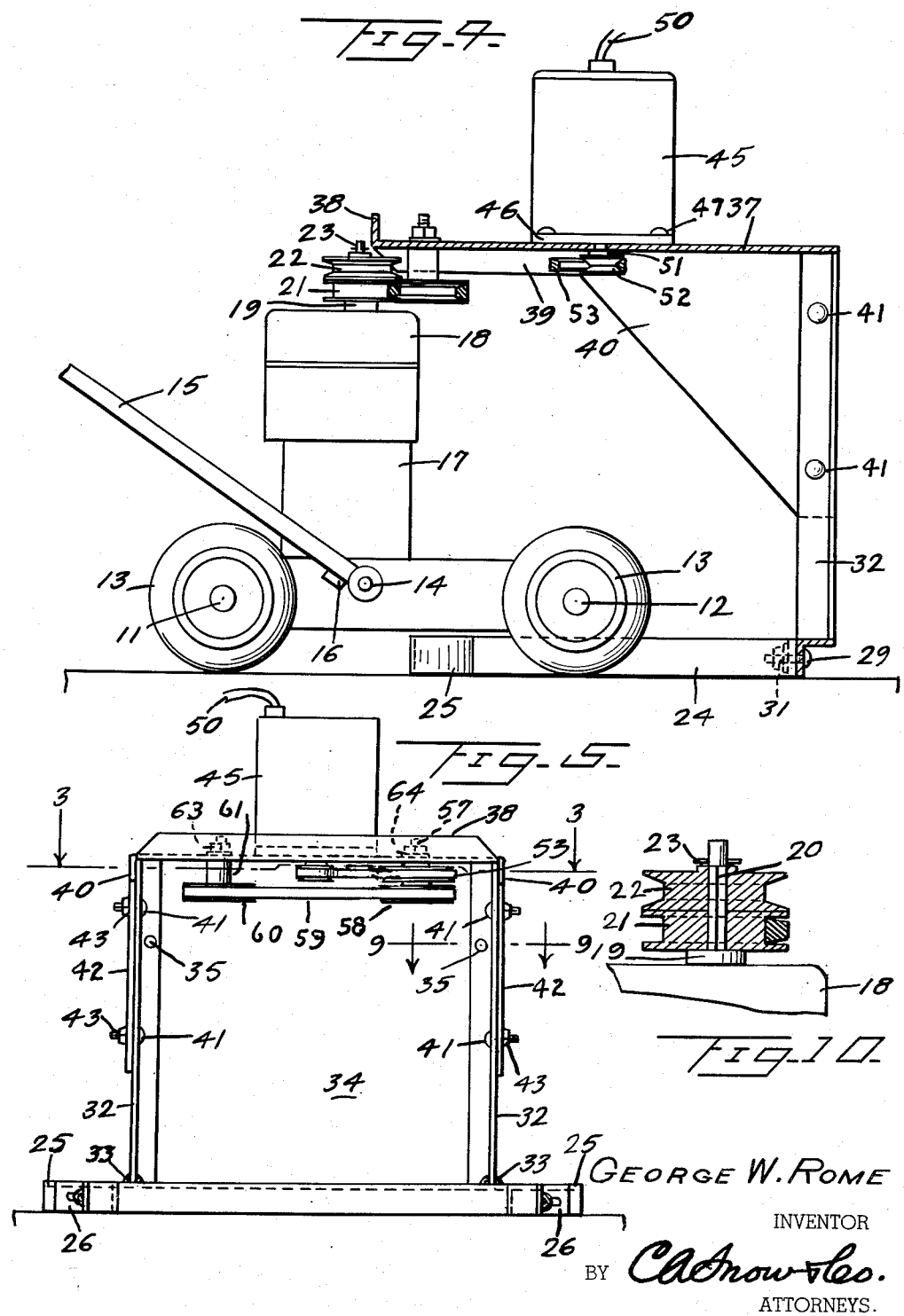
INVENTOR
GEORGE W. ROME
BY
ATTORNEYS.

2,996,927
STARTER FOR LAWN MOWER ENGINES
George Walter Rome, 414 Center St., Arabi, La.
Filed Nov. 10, 1959, Ser. No. 851,995
2 Claims. (Cl. 74—16)

This invention relates to a starter for the internal combustion engines of lawn mowers.

At the present time internal combustion engines for power lawn mowers are commonly started by winding a rope around a pulley on the engine crank shaft and then pulling on the rope. In doing so, it is necessary for the operator to put one foot on the bed of the power lawn mower while pulling on the rope, to hold the lawn mower against tipping. There is an element of danger in thus starting the internal combustion engine of a power lawn mower. The operator may forget to put his foot on the bed of the lawn mower, in which case the latter is almost certain to tip over. Also, the operator's foot may slip off the bed of the lawn mower, in which case the latter may tip over and injure the operator's foot or leg.

An object of the present invention is to provide a power starter for the internal combustion engines of power lawn mowers, which will avoid the use of pull ropes, or other types of hand starters.

Another object of the present invention is to provide a power starter for the internal combustion engines of power lawn mowers, which is operable from a 110 volt, A.C. power line.

A further object of the present invention is to provide a power starter for the internal combustion engines of power lawn mowers, which is readily engageable with and disengageable from the pulley on the crank shaft of the engine.

An additional object of the present invention is to provide a power starter for internal combustion engines of power lawn mowers which is adjustable both horizontally and vertically and this can be accommodated to power lawn mowers of different sizes.

Still other objects, advantages and improvements will become apparent from the following specification, taken in connection with the accompanying drawings, in which:

FIGURE 1 is a top plan view of a power starter for the internal combustion engines of power lawn mowers according to the present invention.

FIG. 2 is a side elevational view of same.

FIG. 3 is a top plan view, partly in section, taken along the section line 3—3 of FIG. 5 and looking in the direction of the arrows.

FIG. 4 is a vertical sectional view, taken on the section line 4—4 of FIG. 1 and looking in the direction of the arrows.

FIG. 5 is a front elevational view of the power starter according to the present invention.

FIG. 6 is a sectional view, taken on the section line 6—6 of FIG. 2 and looking in the direction of the arrows, showing the adjustable joint between the longitudinally and the transversely positioned base frame members.

FIG. 7 is a vertical sectional view, taken on the section line 7—7 of FIG. 1 and looking in the direction of the arrows, showing the mounting of the driven and the driving pulleys.

FIG. 8 is a partial vertical sectional view, taken on the section line 8—8 of FIG. 2 and looking in the direction of the arrows showing the adjustable joint between the frame members and the horizontal supporting shelf.

FIG. 9 is a longitudinal sectional view, taken on the section line 9—9 of FIG. 8 and looking in the direction of the arrows, showing details of the frame construction.

FIG. 10 is a secional view, taken on the section line 10—10 of FIG. 3, looking in the direction of the arrows, showing the double pulleys on the crank shaft of the internal combustion engine of the power lawn mower.

Referring now to the drawings in detail, and to FIGS. 3 and 4 in particular, there is here shown a power lawn mower driven by an internal combustion engine. The power lawn mower includes a bed 10, mounted on front and rear axles 11 and 12, respectively, which latter are supported on wheels 13. On the opposite sides of the bed 10 there are pivotally mounted at 14 draw shafts 15—15. These draw shafts are limited in their downward swinging movement by stop lugs 16 on the bed 10.

The internal combustion engine for the power lawn mower is comprised principally by a cylinder 17, which is mounted on the bed 10, and has at its top a cylinder head 18. A part 19 of the crank shaft of the engine extends through the cylinder head 18, and has a reduced square section 20 at its upper end. Two pulleys 21 and 22 are mounted on the reduced square section 20 of the crank shaft and are held in place by a cotter key 23, which extends through a suitable hole in the reduced square section. The lower pulley 21 is the starting pulley according to the present invention, as will be later described; the upper pulley 22 is used in the conventional starting of the internal combustion engine by a pull rope.

The frame for the starter is comprised by a base, uprights and a top horizontal shelf. The base includes two generally longitudinally extending members 24—24, which have their outer ends 25 turned at an obtuse angle to the main body section to increase bearing stability on the supporting surface, and inner ends formed as right angle toes 26. The base further includes a rear angle bar 28, with one flange in the horizontal and the other in the vertical position. A horizontal adjustment means is provided for accommodating the longitudinally extending base members 24—24 to different tread widths of the power lawn mowers. Short bolts 29 extend through suitable holes in the vertically positioned flange of the rear angle bar 28 and through elongated slots 27 in the toes 26—26 on the longitudinally positioned base member 24—24, and have lock washers 30 and nuts 31 in their outer ends.

The uprights 32—32 are comprised by angle bars, which are secured at their lower ends to the horizontally positioned flange of angle bar 28, as by welding fillets 33. These angle bars 32 each have one flange positioned longitudinally and the other flange positioned transversely of the frame structure.

A back plate 34 is provided and is secured to the transversely positioned flanges of the uprights 32—32 by short bolts 35, which extend through suitable aligned holes in the back plate and the flanges and have nuts 36 on their outer ends.

The top horizontal shelf is comprised by a piece of heavy gauge sheet metal 37. At its forward end the shelf 37 has an upturned flange 38 at right angles to its main body. This right angle flange 38 strengthens the forward end of the shelf, and also acts as a bumper, if an attempt should be made to push the power lawn mower under the shelf without first having raised the latter to the proper height, as will be later explained. On its sides the shelf 37 is turned down on each side to form a flange 39, also at right angles to its main body, which flange extends from the forward edge for approximately half the length of the shelf, and is integral with a triangular shaped gusset plate 40, which extends for the remainder of the length of the shelf. The gusset plates 40—40 embrace the flanges of the uprights 32—32, which are positioned longitudinally of the frame structure. A vertical adjustment means is provided for accommodating the shelf 37 to power lawn mowers of varying heights. Short bolts 41—41 are mounted in suitable holes in the flanges of the uprights 32—32, which are positioned longitudinally of the frame structure and extend through vertically positioned elongated slots 42—42 in the gusset plates 40—40, and have wing nuts 43 on their outer ends.

The starter itself is comprised by an electric motor and a specific arrangement of shafts, pulleys and belts. The electric motor is enclosed by a casing 45, which has a right angle flange 46 at one end. Bolts 47 project through suitable holes in the flange 46 and shelf 37 and have nuts 48 on their outer ends, to hold the motor in place. Wires 50 extend from the electric motor 45 and have a suitable plug (not shown) on their outer ends for connecting the motor to a suitable 110 volt, A.C. electric power source (also not shown). The electric motor 45 has a shaft 51, which projects through a suitable hole in the shelf 37, and carries a V pulley 52 at its outer end.

A belt 53 is trained over the V pulley 52 on the electric motor shaft 51 and over a second V pulley 54, which is drivably mounted on a sleeve 55. The sleeve 55 is rotatably mounted on a threaded shaft 57 which latter extends through a suitable elongated slot in the shaft 37.

The sleeve 55 also carries a second V pulley 58, which is secured for rotation with the sleeve. A belt 59 is trained over the V pulley 58, extends transversely of the shelf 37, and is trained over another V pulley 60, freely mounted on a threaded counter shaft 61, which latter extends through a suitable elongated slot in the shelf 37.

A means for tightening the belt 59 is provided. The threaded shaft 57, which carries the sleeve 55 mounting the V pulleys 54 and 58, and the threaded counter shaft 61, which carries V pulley 50, are mounted in elongated slots 62 transversely of the shelf 37, and each has a washer 63 and a nut 64 on its outer end.

In use the nuts 31 on the short bolts 29 are loosened and the longitudinally extending base members 24—24 are moved toward or away from each other, to accommodate a power lawn mower of the desired tread width. Similarly, the wing nuts 47 on the short bolts 41 are loosened and the shelf 37 positioned at a level to accommodate a power lawn mower of the desired height. The electric motor 48 is then started by inserting the plug (not shown) which receives the far ends of the wires 50 into a socket (also not shown) on a 110 volt, A.C. power line. The power lawn mower may now be wheeled beneath the shelf 37 until the pulley 21 on the crank shaft 19 comes into contact with the moving belt 59. The latter will rotate the pulley 21 and the crank shaft 19. There is no danger of tipping the power lawn mower, as in the case of hand starting, as there is no leverage tending to rotate the bed 10 around the shaft 11.

Having now fully described my invention, what I claim as new and useful and desire to secure by Letters Patent is:

1. An electric starting device for a power lawn mower having a vertically positioned crank shaft and a pulley on the upper end of said crank shaft, comprised by a transversely extending base member, a pair of parallel longitudinally extending base members at right angles to said transversely extending base member and secured to the latter, a pair of uprights at right angles to said transversely extending base member and secured thereto, a horizontal shelf positioned above and in parallel relationship to said longitudinally extending base members and secured at one end to said uprights, a double pulley rotatably mounted on said horizontal shelf adjacent the opposite end and on one side of the longitudinal center line of the latter, a single pulley rotatably mounted on said horizontal shelf adjacent the latter end and on the other side of the longitudinal center line of the latter, a belt trained over said single pulley and one pulley of the double pulley, a motor mounted on said horizontal shelf, a driving pulley mounted on the shaft of said motor, and a belt trained over the driving pulley and the other pulley of the double pulley.

2. An electric starting device for a power lawn mower having a vertically positioned crank shaft and a pulley on the upper end of said crank shaft, comprised by a transversely extending base member, a pair of parallel longitudinally extending base members at right angles to said transversely extending base member, adjustable joints between said longitudinally extending base members and said transversely extending base member, a pair of uprights at right angles to said transversely extending base member and secured to the latter, adjustable joints between said longitudinally extending base member and said uprights, a horizontal shelf positioned above and in parallel relationship to said longitudinally extending base members and secured at one end to said uprights, a double pulley rotatably mounted on said horizontal shelf adjacent the opposite end and on one side of the longitudinal center line of the latter, a single pulley rotatably mounted on said horizontal shelf adjacent the latter end and on the other side of the longitudinal center line of the latter, a belt trained over the said single pulley and one pulley of the double pulley, a motor mounted on said horizontal shelf, a driving pulley mounted on the shaft of said motor, and a belt trained over the driving pulley and the other pulley of the double pulley.

References Cited in the file of this patent

UNITED STATES PATENTS

| | | |
|---|---|---|
| 1,504,766 | Knipfer | Aug. 12, 1924 |
| 2,149,513 | Fischbach | Mar. 7, 1939 |
| 2,475,750 | McCormick et al. | July 12, 1949 |
| 2,603,974 | Jackson | July 22, 1952 |
| 2,910,873 | Bossard et al. | Nov. 3, 1959 |

FOREIGN PATENTS

| | | |
|---|---|---|
| 601,826 | Great Britian | May 13, 1948 |